United States Patent
Cramer et al.

(10) Patent No.: US 9,332,006 B2
(45) Date of Patent: *May 3, 2016

(54) SERVICE ACCOUNT ACCESS

(71) Applicant: International Business Machines Corporation, Armonk, NY (US)

(72) Inventors: Keith D. Cramer, Pine Island, MN (US); Dale H. Manthei, Pine Island, MN (US); Niraj D. Patel, Rochester, MN (US); Benjamin C. VanHavermaet, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,823

(22) Filed: Aug. 15, 2014

(65) Prior Publication Data

US 2015/0350187 A1     Dec. 3, 2015

Related U.S. Application Data

(63) Continuation of application No. 14/288,921, filed on May 28, 2014.

(51) Int. Cl.
  *G06F 21/34*     (2013.01)
  *H04L 29/06*     (2006.01)
  *G06F 21/44*     (2013.01)
  *H04L 9/32*      (2006.01)
  *H04L 29/08*     (2006.01)

(52) U.S. Cl.
  CPC .............. *H04L 63/083* (2013.01); *G06F 21/34* (2013.01); *G06F 21/44* (2013.01); *H04L 9/3228* (2013.01); *H04L 9/3234* (2013.01); *H04L 67/10* (2013.01)

(58) Field of Classification Search
  None
  See application file for complete search history.

(56) References Cited

U.S. PATENT DOCUMENTS

| | | | | |
|---|---|---|---|---|
| 6,731,731 | B1 * | 5/2004 | Ueshima | 379/196 |
| 7,685,425 | B1 * | 3/2010 | Wright et al. | 713/176 |
| 8,166,310 | B2 * | 4/2012 | Harrison et al. | 713/184 |
| 8,301,900 | B1 * | 10/2012 | Juang | 713/184 |
| 8,869,251 | B2 * | 10/2014 | Miller et al. | 726/6 |
| 2003/0070074 | A1 * | 4/2003 | Geller et al. | 713/168 |
| 2004/0107257 | A1 * | 6/2004 | Inoue et al. | 709/206 |
| 2004/0189441 | A1 * | 9/2004 | Stergiou | 340/5.51 |

(Continued)

FOREIGN PATENT DOCUMENTS

WO     2009154705 A1    12/2009

OTHER PUBLICATIONS

IBM, "Pesh command," http://pic.dhe.ibm.com/infocenter/flexsys/information/topic/com.ibm.acc . . . (last accessed May 22, 2014 10:06 AM).

Sophos, "SafeGuard Easy Administrator Help," Product version 6, Feb. 2012.

(Continued)

*Primary Examiner* — Benjamin Lanier
(74) *Attorney, Agent, or Firm* — Laura E. Gisler; Grant Johnson

(57) ABSTRACT

A computer system detects an external media device and determines the external media device contains authentication data for the computer system. In response, a first password is generated based on an identifier unique to the computer system. A prompt is displayed for a second password obtained from a service provider. The second password is received through an input device. The computer system provides access to the service account if the second password matches the first password.

7 Claims, 4 Drawing Sheets

(56) References Cited

U.S. PATENT DOCUMENTS

2006/0064600 A1* 3/2006 Polichetti et al. ............. 713/183
2007/0245150 A1* 10/2007 Lu et al. ........................ 713/184
2009/0271855 A1* 10/2009 Buzzard ............................ 726/9
2012/0233675 A1* 9/2012 Hird .................................. 726/6
2013/0046645 A1* 2/2013 Grigg et al. .................. 705/26.1

OTHER PUBLICATIONS

Cramer, K. et al., "Service Account Access," U.S. Appl. No. 14/288,921, filed May 28, 2014.

IBM, "List of IBM Patents or Patent Applications Treated as Related."

* cited by examiner

SERVICE ACCOUNT ACCESS

BACKGROUND

The present disclosure relates to computer system security, and more specifically, to providing service account access.

Computer users sometimes forget their passwords. Ordinary users can solve this problem by contacting their system administrator. However, when the system administrator account itself becomes locked, the method of contacting a system administrator will not allow access. Some existing solutions include security questions, backdoor account, hardware key, biometric system access, and reinstall.

SUMMARY

According to embodiments of the present disclosure, a method for providing access to a service account is disclosed. The method includes detecting, by a computer system, an external media device. The method further includes determining the external media device contains authentication data for the computer system, and in response: generating a first password based on an identifier unique to the computer system; displaying a prompt to a user for a second password, receiving the second password from the user through an input device; and providing access to the service account if the second password matches the first password.

Also disclosed herein are embodiments of a computer program product for providing access to a service account. The computer program product includes a computer readable storage medium having program code embodied therewith. The program code is executable by a computer to perform a method. The method includes detecting, by a computer system, an external media device. The method further includes determining the external media device contains authentication data for the computer system, and in response: generating a first password based on an identifier unique to the computer system; displaying a prompt to a user for a second password, receiving the second password from the user through an input device; and providing access to the service account if the second password matches the first password.

Also disclosed herein are embodiments of another computer program product for providing access to a service account. The computer program product includes a computer readable storage medium having program code and authentication data tangibly embodied thereon. The authentication data comprises information unique to a computer system. The program code is executable by the computer system to perform a method. The method includes generating a first password based on an identifier unique to the computer system. The method further includes displaying a prompt to a user for a second password. The method further includes receiving the second password from the user through an input device. The method further includes providing access to the service account if the second password matches the first password.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
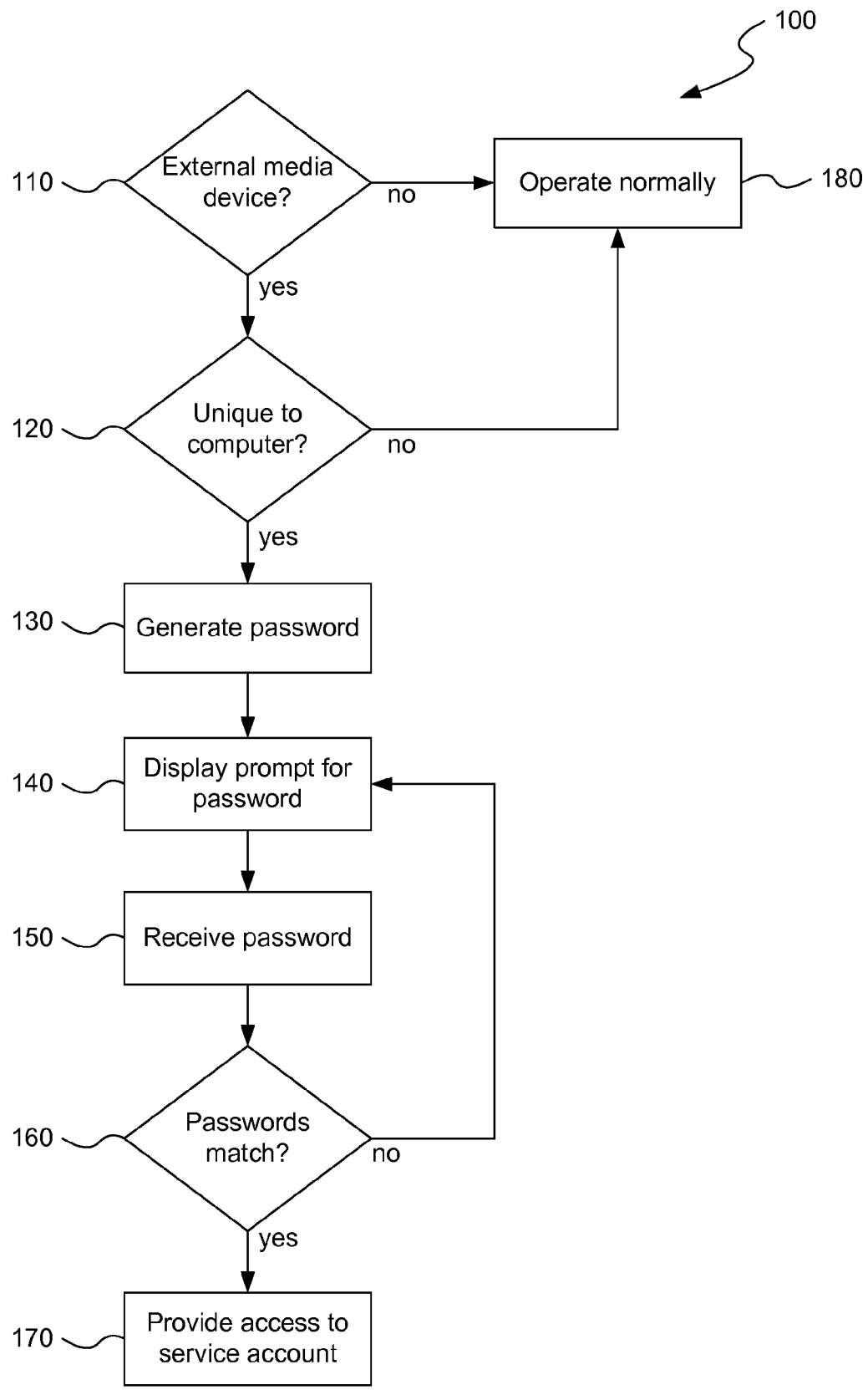
FIG. 1 depicts a flow diagram of an example method for providing a service account on a computer system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer system security. More particular aspects relate to providing service account access. While the present disclosure is not necessarily limited to such applications, various aspects of the disclosure may be appreciated through a discussion of various examples using this context.

Embodiments of the present invention provide a method for accessing a service account on a computer system protected by at least three layers of security, including ensuring that the user has physical access to a recovery key; ensuring the user has physical access to the computer on which the password will be reset; and ensuring the user is authorized to access the service account. In some embodiments, this service account may be used to reset administrative, or "root" passwords.

In operation, some embodiments begin with a setup phase. During this setup phase, a user of a computer system creates an account with a password recovery service. This account contains sufficient primary authentication information so that the password recovery service can remotely authenticate that user in the future. One suitable method is to establish a number of challenge questions and corresponding answers during the computer system's IPL or registration process, which the service provider will store in a secure account database at its premises. Other embodiments may supplement or substitute the challenge question pairs with identifying information associated with the user (e.g., a serial number) and/or by identifying other accounts associated with that user (e.g., an email address). Still other embodiments may additionally require that the registering user prove they currently have access to their account using the recovery key/recovery program handshake, described in more detail below.

Also during the setup phase, the user may identify and securely store an external, recovery media that contains secondary authentication information uniquely associated with one specific, physical computer system, and that limits access to a special service account for that system. As will be explained in more detail below, this recovery media and secondary authentication information can be used by the service provider during a subsequent recovery phase to establish that an authenticated user currently has physical access to the computer system.

In some embodiments, the recovery media comprises an external, computer readable media device, such as a USB memory device or DVD disk. In some of these embodiments, the secondary authentication information, in turn, comprises a random code generated by the computing system during IPL or registration, and then encrypted using the system's private encryption key. Later, during the recovery phase, the computer system in these embodiments can detect the media device during its boot cycle, decrypt the code stored on the external media, and determine that the decrypted code matches the original before allowing access to the service account. In another embodiment, the secondary authentication information comprises an encrypted, executable copy of the password recovery program described below that can only be recognized by and executed on its corresponding computer system. In other embodiments, the media device may contain both the encrypted, random code and an executable copy of the password recovery program in either encrypted or unencrypted format. In still other embodiments, the media device is created by the manufacturer of the computer system and shipped in-the-box alongside that system, or created by the service provider and shipped to the administrator by secure postal or parcel service. Other forms of secondary authentication information and methods of validating the recovery media are also within the scope of the invention.

In the event that the user forgets their password for or is otherwise unable to access their account on a particular computer system, the user initiates the recovery phase. In one embodiment, the user begins by retrieving the external recovery media associated with the particular computing device they are unable to access. The user then inserts the external recovery media into the computer system and reboots the system. In this way, the user establishes that they currently have physical access to the computer system.

The computer system in this embodiment detects the recovery media during is boot process and, in response, begins to execute the recovery program. The recovery program, in turn, algorithmically generates a password for accessing the service account on the computer system. This algorithmic password may be generated based using any code or identifier that is unique to the computer system and accessible to the user, such as a system serial number, hardware serial number, MAC address, or software license key. The generated password may also be based on a temporal indicator, such as date and time, and on some information unique to the user in some embodiments. In this way, the generated password in these embodiments may only be valid for a limited period of time and for use by a particular user.

Next, the recovery program in some embodiments prompts the user to enter the generated password. However, the user in these embodiments may only obtain the generated password by contacting the support provider by telephone, chat session, email, or other communication method. In response to that contact, the support provider will first authenticate the user using the primary authentication information provided during the setup phase. In some embodiments, the support provider will also prompt the user for the hardware identifiers, software keys, and temporal identifiers, used as inputs to the password generation algorithm at this time. In other embodiments, the service provider may obtain some or all of this information from its account database or from remotely querying the locked computer system. The support provider may then input the gathered information into its copy of the password generation algorithm.

The support provider in these embodiments communicates the generated password to the user, and the user enters that password into the recovery program on the computer system. If the password entered by the user (i.e., obtained from the service provider) matches the password previously generated by the computer system, then the computer system will provide that user access to a service account. The service account, in turn, provide the user with a variety of options, including to resetting their account password. In other embodiments, the computer system may immediately prompt the user to enter a new personal password before allowing further access to the service account.

In this way, embodiments of the invention allow the service provider to perform a method for restoring root access to a remote system computer. In one such embodiment, the service provider creates an authorized administrator record for an authorized administrator of the computer system in a database controlled by the service provider, the authorized administrator record comprising a plurality of challenge question and answer pairs associated with the authorized administrator; and provides restricted access to a remote recovery routine at the remote computer system via a recovery media, the recovery media stored on a tangible media external to the remote computing device. In response to a request to reset a lost administrator password received at the service provider from an unverified user of the computer system, the service provider can automatically authenticate the unverified user using at least one of the challenge question and answer pairs from the authorized administrator record, generate a password on a processor associated with the service processor using an identifier uniquely associated with the remote computing system; and communicate the generated password to the authenticated user for entry by the authenticated user into the remote routine, whereby entry validates physical access of the authenticated user to the remote computer system.

Referring to FIG. 1, a flow diagram of an example method 100 for providing a service account on a computer system is depicted. Method 100 may occur while booting up the computer system. At block 110, the computer system may determine if an external media device is detected. The external media device may be any media device such as an external hard drive, flash memory device, CD, or DVD. The external media device may be physically coupled to computer system in a variety of ways including through a USB or other hardware port, or optical drive. If an external media device is not detected, method 100 may proceed to block 180. At block 180, the computer system may operate normally. For example, if the computer system is booting up, it may continue booting up to the normal user login.

At block 110, if the computer system identifies an external media device, method 100 may proceed to block 120. At block 120, the computer system may determine if the external media device contains an authentication key or encrypted program code which is unique to the computer system. If the external media device does not have the authentication key or encrypted program code, method 100 may proceed to block 180. If the computer system determines that the external media device contains the key or encrypted program code unique to the computer system, method 100 may proceed to block 130.

At block 130, the computer system may generate a password. The password may be based on an identifier which is unique to the computer system. Example identifiers include unique hardware identifiers and unique software license keys. The password may further be based on a temporal indicator such as the date and/or time. The identifier and temporal indicator may be input into an algorithm which generates the password. In some embodiments, the password may be a temporary password which is only valid for a period of time.

At block 140, the computer system may display a prompt for a password. The prompt may include a window in which a user may enter the password using an input device such as a keyboard. In some embodiments, the prompt may also display the identifier and the temporal indicator used to generate the password for the user to provide to a support provider. At block 150, the computer system may receive a password through an input device, for example, from the user. The user may obtain this password from a service provider by telephone, chat session, email, or any other communication method.

At block 160, the computer system determines if the password received at block 150 matches the password generated at block 130. If the passwords do not match, method 100 may return to block 140 and display the prompt for the password again. If the passwords match, method 100 may proceed to block 170. At block 170, the computer system provides access to a service account. The service account may allow a user to reset the password for logging on to the computer system.

In some embodiments, the instructions to perform parts of method 100 may themselves be stored on the external media device. The computer system may execute instructions on the external media device in response to determining that the external media device contains authentication data unique to the computer system at block 120. For example, instructions to perform the parts of method 100 represented by blocks 130-170 may be stored on the external media device. Further, the external media device may contain its own operating system, which is given control of the computer system after it is determined that the external media device contains authentication data unique to the computer system at block 120. The data on the external media device may be encrypted to prevent unauthorized access or modification of the data.

Figure 2A:
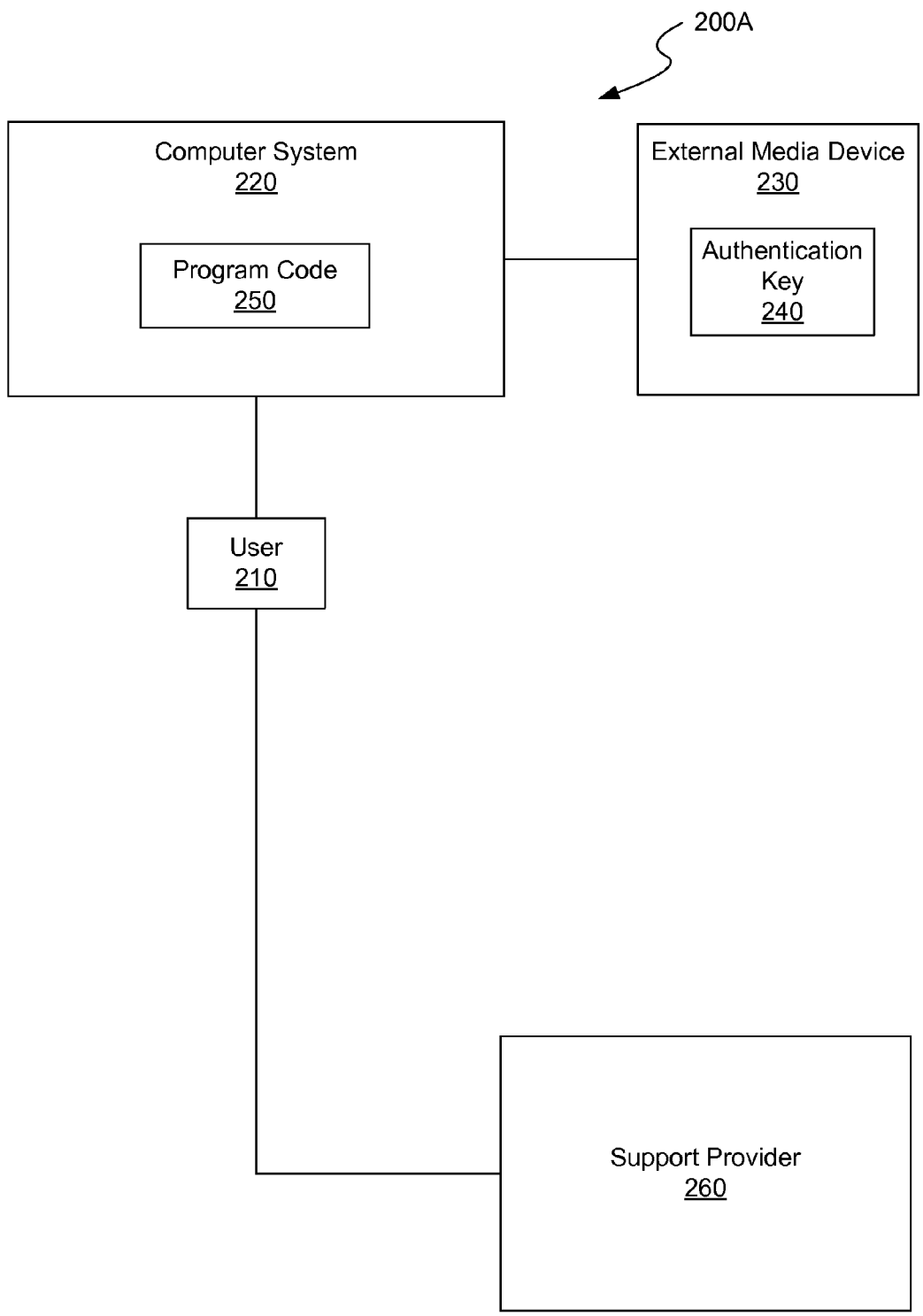
FIGS. 2A-2B depict block diagrams of example systems for providing a service account.

Referring to FIG. 2A, a block diagram of an example system 200A for providing access to a service account is depicted. As depicted, external media device 230A is associated with computer system 220A. External media device 220A may be an external hard drive, flash memory device, CD, or DVD. The external media device may be associated with the computer system in a variety of ways, including through a USB or other hardware port, or optical drive.

In this embodiment, user 210 physically inserts the external media device 230A into the computer system 220A when they are locked out of that computer system 220A. For example, user 210 may plug a USB-style external media device 230A into a corresponding USB port on computer system 220A. External media device 230A may contain authentication key 240 which is unique to computer system 220A. Authentication key 240 may be a randomly generated code. Computer system 220A may determine that external media device 230A contains the correct authentication key 240 and, in response, execute program code 250 on computer system 220A. Execution of program code 250 may cause computer system 220A to perform elements of the method depicted in FIG. 1.

Computer system 220A may generate a password using an identifier unique to computer system 220A and, in some embodiments, a temporal indicator. Computer system 220A may display a prompt to user 210 to enter the password. Computer system 220A may also display the identifier and temporal indicator used to generate the password. User 210 may contact support provider 260 to obtain the password. Support provider 260 may generate the password using the identifier and temporal indicator. Support provider 260 may obtain the identifier and temporal indicator from user 210. In some embodiments, support provider 260 may already have the identifier and temporal indicator for computer system 220A. For example, the support provider may have the identifier stored for a particular user and the support provider may determine the temporal indicator itself, for example, by determining the current date. Support provider 260 may provide the generated password to user 210. Support provider 260 may require user 210 to answer security questions before providing user 210 with the generated password.

User 210 may then enter the password obtained from support provider 260 into computer system 220A using an input device such as a keyboard. Computer system 220A may compare the password received from user 210 to the password it generated. If the passwords match, computer system 220A may provide user 210 access to a service account.

Figure 2B:
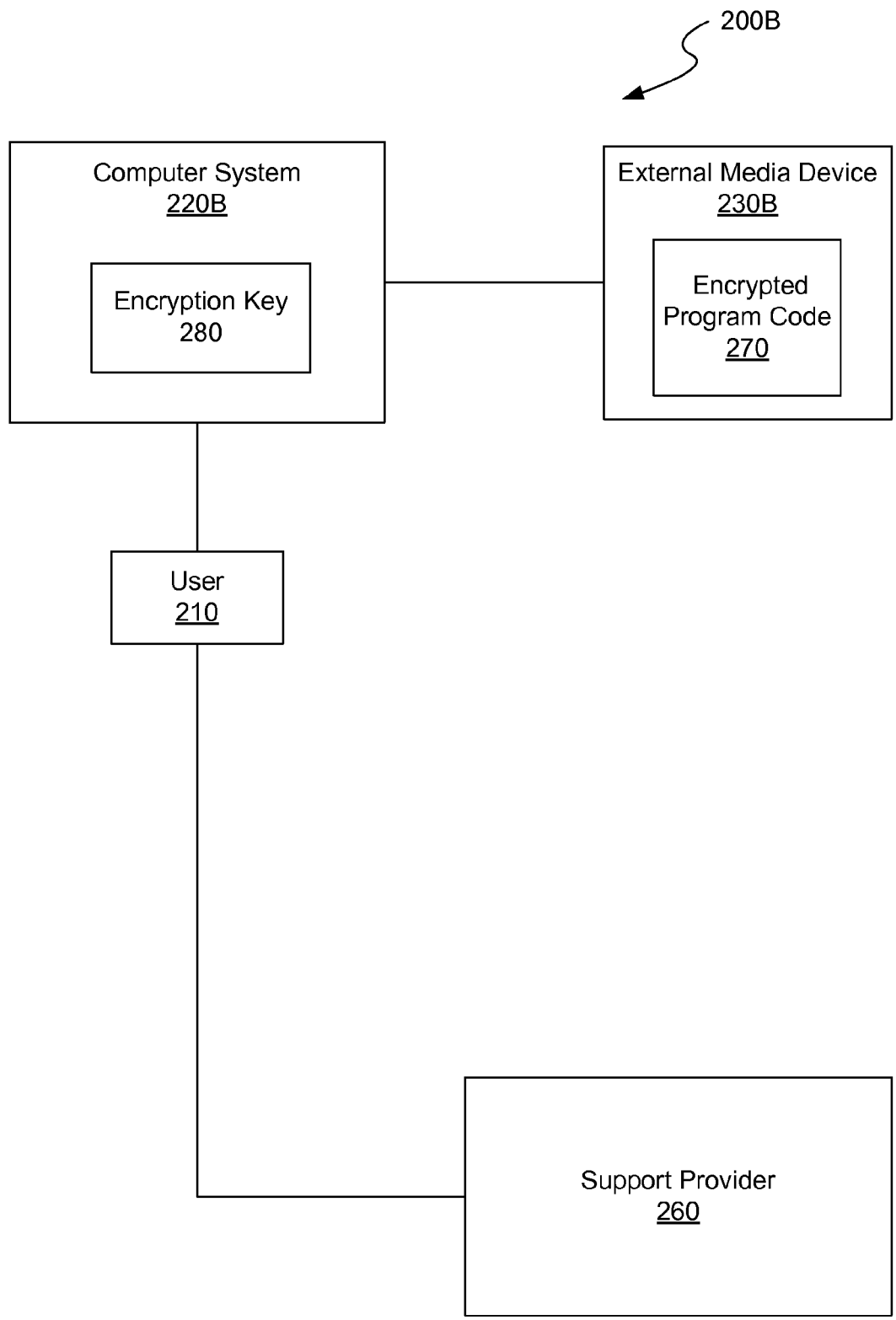

Referring to FIG. 2B, a block diagram of another example system 200B for providing access to a service account is depicted. As depicted system 200B has computer system 220B associated with external media device 230B. Unlike the embodiment in FIG. 2A, however, external media device 230B contains encrypted program code 270 and computer system 220B contains encryption key 280. Computer system 220B may decrypt encrypted program code 270 using encryption key 280 and, in response, execute encrypted program code 270. Execution of encrypted program code 270 may cause computer system 220B to perform elements of the method depicted in FIG. 1.

Figure 3:
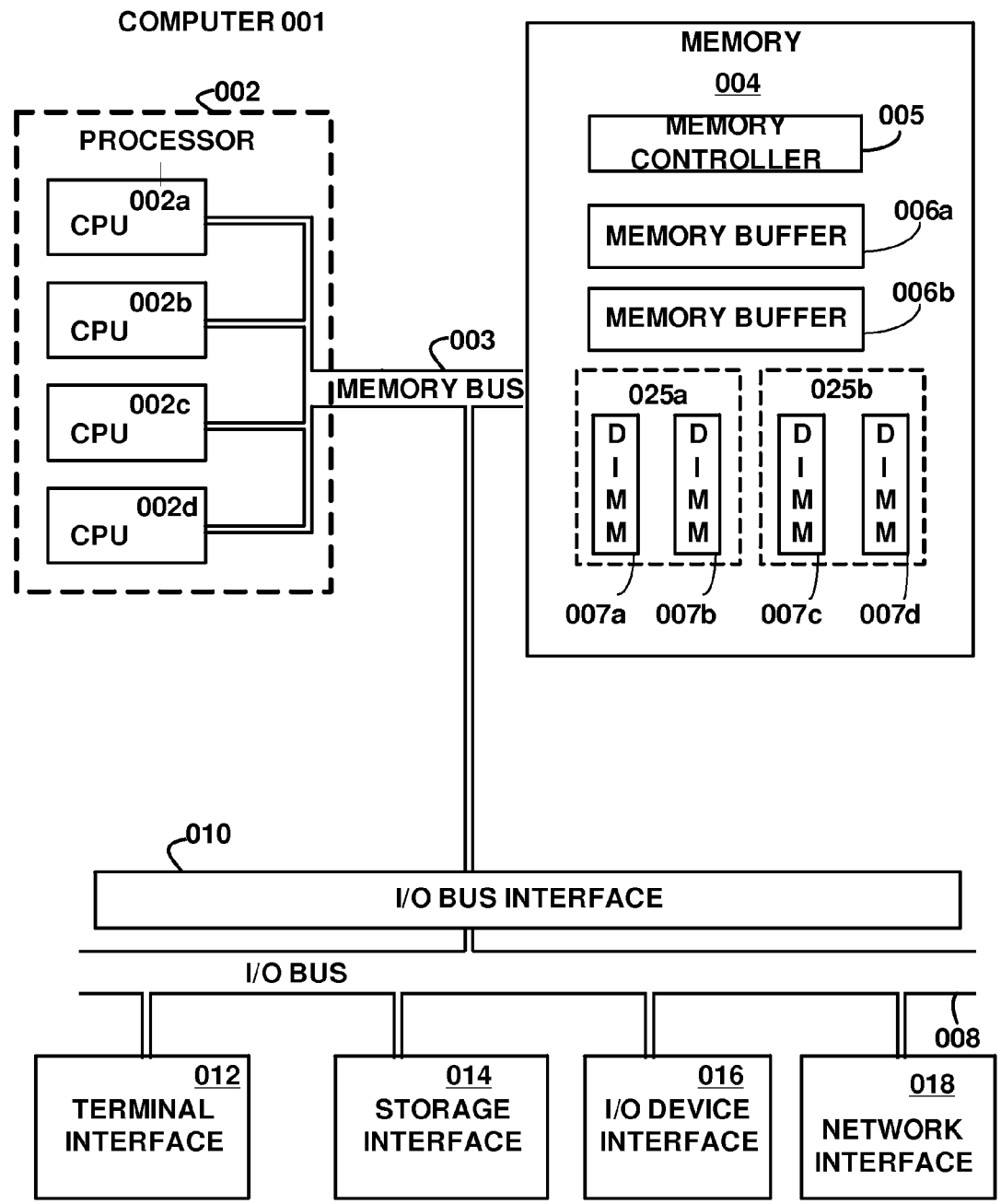
FIG. 3 depicts a high-level block diagram of an example system for implementing one or more embodiments of the invention.

Referring to FIG. 3, a high-level block diagram of an example system for implementing one or more embodiments of the invention is depicted. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffer 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 3 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 3 is intended to depict the representative major components of an exemplary computer system 001. But individual components may have greater complexity than represented in FIG. 3, components other than or in addition to those shown in FIG. 3 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for providing access to a service account, the method comprising:
   generating, by a computer system, a random code;
   encrypting, by the computer system, the random code;
   storing, on an external media device, the encrypted random code;
   detecting, by the computer system, the external media device;
   determining the external media device contains the encrypted random code, and in response:
   generating, based on an identifier unique to the computer system, a first password;
   displaying a prompt to a user for a second password, the second password received by the user from an external service provider and based on the identifier;
   receiving the second password from the user through an input device; and
   providing access to the service account if the second password matches the first password.

2. The method of claim 1, wherein the identifier is selected from the group consisting of a hardware identifier and a software license key.

3. The method of claim 1, wherein the first password and the second password are further based on a temporal indicator.

4. The method of claim 3, wherein the temporal indicator is a current date.

5. The method of claim 1, further comprising:
   creating an authorized user account in a database controlled by the service provider, the authorized user account comprising a plurality of challenge question and answer pairs associated with the user.

6. The method of claim 1, wherein the generating the first password is performed using encrypted program instructions stored on the external media device.

7. A method for providing access to a service account, the method comprising:
   creating an authorized user account in a database controlled by the service provider, the authorized user account comprising a plurality of challenge question and answer pairs associated with a user;

generating, by a computer system, a random code;

encrypting, by the computer system, the random code;

storing, on an external media device, the encrypted random code;

detecting, by the computer system, the external media device;

determining the external media device contains the encrypted random code;

executing, in response to the determining, instructions on the external media device to perform steps comprising:

generating, based on an identifier unique to the computer system and a current date, a first password, the identifier selected from the group consisting of a hardware identifier and a software license key;

displaying a prompt to the user for a second password, the second password received by the user from an external service provider and based on the identifier and a current date;

receiving the second password from the user through an input device; and providing access to the service account if the second password matches the first password.

* * * * *